United States Patent
Giannone

(10) Patent No.: US 11,525,713 B2
(45) Date of Patent: Dec. 13, 2022

(54) ELECTRONIC CONTROL DEVICE FOR CONTROLLING SENSORS

(71) Applicant: ATLAS COPCO BLM S.R.L., Paderno Dugnano (IT)

(72) Inventor: Sergio Giannone, Milan (IT)

(73) Assignee: ATLAS COPCO BLM S.R.L., Paderno Dugnano (IT)

( * ) Notice: Subject to any disclaimer, the term of this patent is extended or adjusted under 35 U.S.C. 154(b) by 88 days.

(21) Appl. No.: 14/780,550

(22) PCT Filed: Mar. 26, 2014

(86) PCT No.: PCT/IB2014/060180
§ 371 (c)(1),
(2) Date: Sep. 27, 2015

(87) PCT Pub. No.: WO2014/155316
PCT Pub. Date: Oct. 2, 2014

(65) Prior Publication Data
US 2016/0054156 A1  Feb. 25, 2016

(30) Foreign Application Priority Data
Mar. 29, 2013 (IT) .......................... MI2013A000495

(51) Int. Cl.
| | |
|---|---|
| *G01D 1/00* | (2006.01) |
| *G01D 18/00* | (2006.01) |
| *G01D 21/00* | (2006.01) |
| *B25B 21/00* | (2006.01) |
| *G01D 11/24* | (2006.01) |

(52) U.S. Cl.
CPC ............. *G01D 18/00* (2013.01); *B25B 21/00* (2013.01); *G01D 21/00* (2013.01); *G01D 11/245* (2013.01)

(58) Field of Classification Search
CPC ...... G01D 18/00; G01D 11/245; G01D 21/00; B25B 21/00
See application file for complete search history.

(56) References Cited

U.S. PATENT DOCUMENTS 3,705,385 A * 12/1972 Batz .................... H04Q 9/14
340/870.02
4,597,480 A * 7/1986 Schwarz ................ F16D 11/16
192/30 W (Continued)

FOREIGN PATENT DOCUMENTS

JP  H07 113864 A  5/1995

OTHER PUBLICATIONS

International Search Report dated Jul. 10, 2014.
English Abstract for JP H07 113864 A dated May 2, 1995.

*Primary Examiner* — Jay C Kim
(74) *Attorney, Agent, or Firm* — Hedman & Costigan, P.C.; James V. Costigan; Kathleen A. Costigan

(57) ABSTRACT

An electronic control device (2) for controlling a sensor (3) comprising a box-shaped body provided on one side with an electronic connector (21), suitable for coupling with an analogous electrical connector (31) associated with such a sensor (3).

Figure 2:
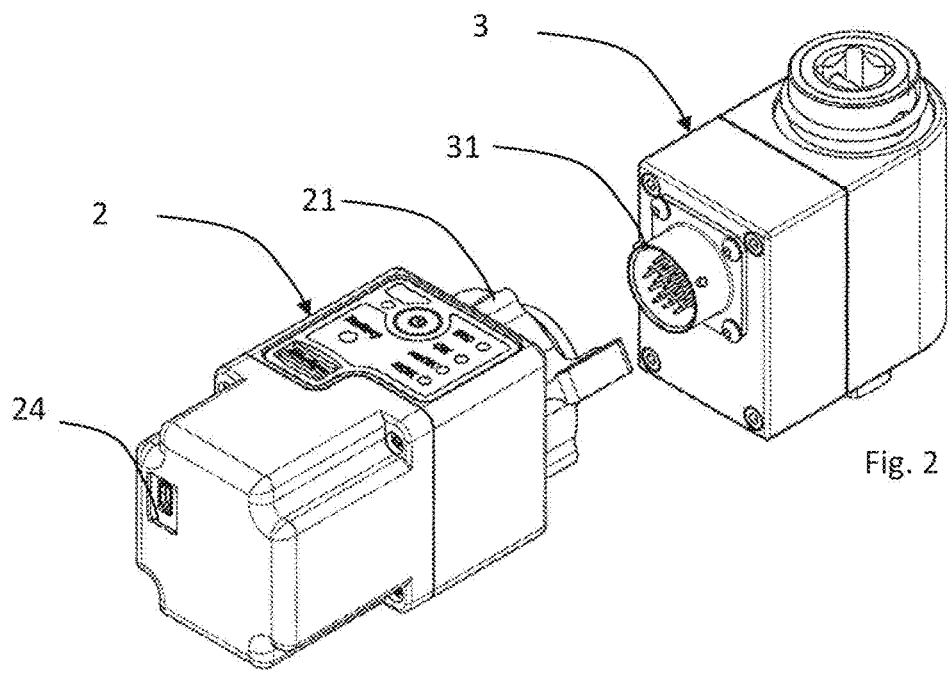

Such a device, inside such a box-shaped body, comprises electrical power supply means (22) for supplying said sensor, at least one electronic control board (23) for controlling said sensor, with which radio transmission means of the data detected by the sensors are associated.

5 Claims, 2 Drawing Sheets

(56) References Cited

U.S. PATENT DOCUMENTS

| | | | | |
|---|---|---|---|---|
| 4,734,702 A * | 3/1988 | Kaplan | G01S 3/48 | 342/424 |
| 5,039,991 A * | 8/1991 | Boese | G01S 3/043 | 342/420 |
| 5,396,255 A * | 3/1995 | Durkota | H01Q 3/267 | 342/173 |
| 5,481,913 A * | 1/1996 | Ito | G01C 19/5607 | 73/504.16 |
| 5,734,373 A * | 3/1998 | Rosenberg | A63F 13/06 | 345/161 |
| 5,763,943 A * | 6/1998 | Baker | H01L 25/065 | 257/686 |
| 6,177,883 B1 * | 1/2001 | Jennetti | G08C 17/02 | 340/870.02 |
| 6,195,018 B1 * | 2/2001 | Ragle | G08C 15/06 | 340/870.01 |
| 6,292,170 B1 * | 9/2001 | Chang | G06F 3/011 | 345/156 |
| 6,343,349 B1 * | 1/2002 | Braun | G05B 19/00 | 341/27 |
| 6,424,356 B2 * | 7/2002 | Chang | G05B 19/00 | 345/156 |
| 6,564,480 B1 * | 5/2003 | Tomita | E02F 9/24 | 37/348 |
| 6,889,165 B2 * | 5/2005 | Lind | G01D 9/005 | 702/182 |
| 6,933,857 B2 * | 8/2005 | Foote | H04Q 9/00 | 340/870.02 |
| 7,233,285 B2 * | 6/2007 | Struckman | G01S 5/04 | 342/451 |
| 7,275,450 B2 * | 10/2007 | Hirai | B25B 21/00 | 73/862.21 |
| 7,429,936 B2 * | 9/2008 | Paradiso | G08B 25/009 | 340/539.13 |
| 7,565,844 B2 * | 7/2009 | Crass | B25B 23/1425 | 73/862.21 |
| 7,675,257 B2 * | 3/2010 | Beifus | G05B 23/0264 | 318/565 |
| 7,683,775 B2 * | 3/2010 | Levinson | H04Q 9/00 | 340/521 |
| 7,779,704 B1 * | 8/2010 | Chu | B25B 23/14 | 73/862.338 |
| 7,781,666 B2 * | 8/2010 | Nishitani | A63B 71/0686 | 84/600 |
| 7,806,026 B2 * | 10/2010 | Gauthier | B25B 23/1427 | 81/467 |
| 7,934,428 B2 * | 5/2011 | Schultz | B25B 23/14 | 73/761 |
| 8,099,124 B2 * | 1/2012 | Tilley | G06F 1/1626 | 455/550.1 |
| 8,160,640 B2 * | 4/2012 | Rofougaran | G01S 7/412 | 455/550.1 |
| 8,200,287 B2 * | 6/2012 | Kushida | H04B 7/0608 | 455/562.1 |
| 8,204,684 B2 * | 6/2012 | Forstall | G01C 21/20 | 455/456.1 |
| 8,264,374 B2 * | 9/2012 | Obatake | B25F 5/00 | 340/870.4 |
| 8,302,496 B2 * | 11/2012 | Furey | G01D 11/245 | 73/866.5 |
| 8,381,568 B2 * | 2/2013 | Chen | G01L 25/003 | 73/1.12 |
| 8,395,496 B2 * | 3/2013 | Joshi | G01D 11/24 | 340/539.1 |
| 8,398,011 B2 * | 3/2013 | Kuriyama | A01K 89/0155 | 242/223 |
| 8,427,426 B2 * | 4/2013 | Corson | G06F 3/0325 | 345/157 |
| 8,443,703 B2 * | 5/2013 | Chen | B25B 23/1425 | 81/479 |
| 8,484,049 B2 * | 7/2013 | Mullenger | G06Q 10/087 | 705/3 |
| 8,485,049 B2 * | 7/2013 | Yokoyama | B25B 23/14 | 73/862.21 |
| 8,485,075 B1 * | 7/2013 | Gauthier | B25B 23/1425 | 81/177.5 |
| 8,584,554 B2 * | 11/2013 | Chen | B25B 23/0078 | 81/57.14 |
| 8,718,797 B1 * | 5/2014 | Addepalli | H04W 4/046 | 700/17 |
| 8,844,381 B2 * | 9/2014 | Gharib | B25B 23/1425 | 73/862.21 |
| 8,952,832 B2 * | 2/2015 | Nasiri | G06F 3/0346 | 341/20 |
| 8,984,962 B2 * | 3/2015 | Christmann | G01L 3/1428 | 73/862.041 |
| 9,008,854 B2 * | 4/2015 | Breed | F02N 11/0807 | 701/1 |
| 9,027,681 B2 * | 5/2015 | Biderman | B60L 7/18 | 180/65.51 |
| 9,090,300 B2 * | 7/2015 | Kitamura | B62J 99/00 | |
| 9,127,642 B2 * | 9/2015 | Zhu | F03D 17/00 | |
| 9,156,148 B2 * | 10/2015 | King | B25B 23/1425 | |
| 9,162,573 B2 * | 10/2015 | Grajkowski | B60K 26/04 | |
| 9,180,984 B2 * | 11/2015 | Peterka, III | B64G 1/002 | |
| 9,216,440 B2 * | 12/2015 | Ma | A61L 2/24 | |
| 9,320,558 B2 * | 4/2016 | Cattaneo | B25B 23/1425 | |
| 9,482,988 B2 * | 11/2016 | Hosokawa | G03G 15/0865 | |
| 9,523,618 B2 * | 12/2016 | King | G01L 5/24 | |
| 9,633,783 B2 * | 4/2017 | Lindstrom | H01F 38/18 | |
| 9,682,319 B2 * | 6/2017 | Zalewski | A63F 13/10 | |
| 9,714,568 B2 * | 7/2017 | Rendusara | E21B 47/13 | |
| 9,770,816 B2 * | 9/2017 | Yokoyama | G01B 5/24 | |
| 9,915,688 B2 * | 3/2018 | Bauer | G01D 4/006 | |
| 10,041,896 B2 * | 8/2018 | Furey | G01D 11/245 | |
| 10,613,956 B2 * | 4/2020 | Yeo | H04L 67/1002 | |
| 2007/0146325 A1 * | 6/2007 | Poston | G06F 3/0317 | 345/163 |
| 2009/0058663 A1 | 3/2009 | Joshi et al. | | |
| 2009/0290005 A1 * | 11/2009 | Wanibe | B41J 2/17566 | 347/86 |
| 2011/0132155 A1 * | 6/2011 | Chiapuzzi | B25F 5/00 | 81/467 |
| 2011/0192235 A1 * | 8/2011 | Hsu | B25B 23/1425 | 73/862.23 |
| 2011/0276312 A1 * | 11/2011 | Shalon | A61B 5/6838 | 702/187 |
| 2012/0132042 A1 * | 5/2012 | Bruce | B25B 23/1425 | 81/479 |
| 2013/0024060 A1 * | 1/2013 | Sukkarie | G01C 21/26 | 701/22 |

\* cited by examiner

ELECTRONIC CONTROL DEVICE FOR CONTROLLING SENSORS

The present invention refers to an electronic control device for sensors. In particular, the present invention refers to an electronic control device for controlling sensors of different nature present on the market, for example sensors that are suitable for measuring parameters like the torque, force, angle, length etc. . . and combinations of the aforementioned parameters.

One possible field of application of such sensors is that of verifying the behaviour of industrial screwers through the measurement of the rotating and/or braking torque of the rotating shaft.

At the state of the art it is known for there to be innumerable sensors that take such measurements (torque, force, angle, length etc. . . . ) also combined with one another and that transmit the measurement signal through a special wire to a unit for acquiring data, which is usually suitable for converting the analog or digital signal into a measurement that can be understood by the user who is carrying out the measuring itself.

Typically, on such sensors, an extensometer bridge is applied for measuring the torque, force, compression etc. . . . rather than accelerometers, encoders or gyroscopes for reading the angle. The signals of the extensometers and of the measurement of the angle are not processed on board of the transducer, but through the aforementioned connection wire they are transmitted to a separate unit which conversions them and also through special calculation algorithms determines the relative measurement.

Finally, on the market there are sensors that are capable of transmitting, via radio, signals relating to the measurements carried out, but these are integrated objects in which the electronic components that are suitable for conditioning the signal and its transmission via radio, lies inside the sensor itself.

The wires that are normally used for connecting the sensor to the electronic device that controls and drives the sensor itself are normally very long (even 20-30 metres), so as to be able to manage the logistics of the space in which the devices themselves are arranged. Indeed, it is possible, in one same space, for there to be many sensors and all the signals thereof must be conveyed to a same apparatus, housing the various controlling devices. Therefore, in order to manage the logistics of the environment, the wires are usually selected rather long, but this interferes with the quality of the signal. Moreover, the aforementioned wires can become damaged, they can be unintentionally cut or become frayed thus interrupting the flow of the transported signals. Finally, the aforementioned wires are often connected to and disconnected from devices through the connectors thereof. These operation, which are repeated often can also damage the wire and negatively affect the quality of the signal. The fragility of the wire/connector coupling forces the user to change the wires very often, so that these sometimes have a guarantee limited to only 3 months by a manufacturer.

The present invention proposes to make an electronic control device for controlling sensors that are capable of solving the aforementioned drawbacks.

One aspect of the present invention concerns a device having the characteristics of the attached claim 1.

Figure 1:
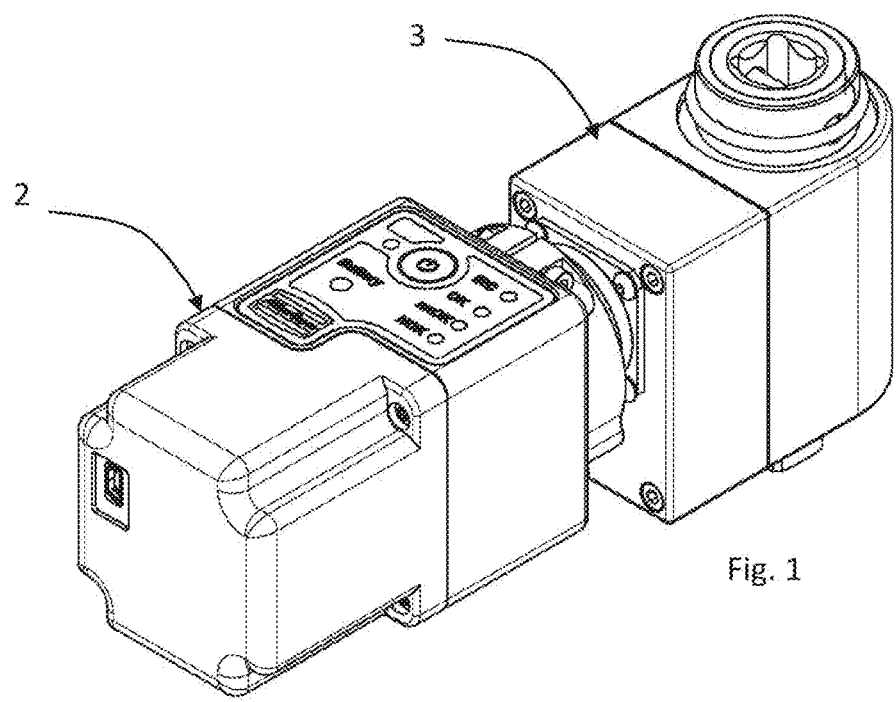
Figure 3:
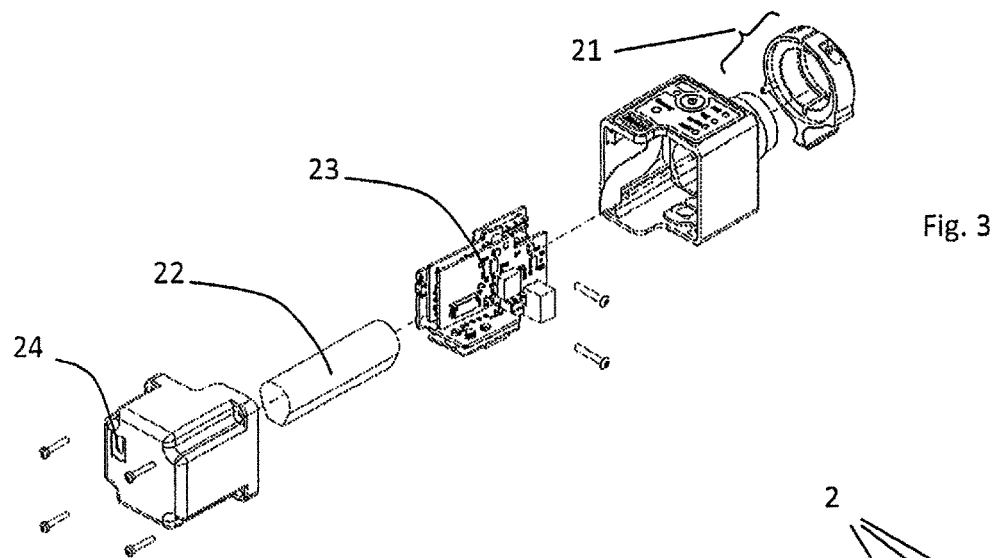
Figure 4:
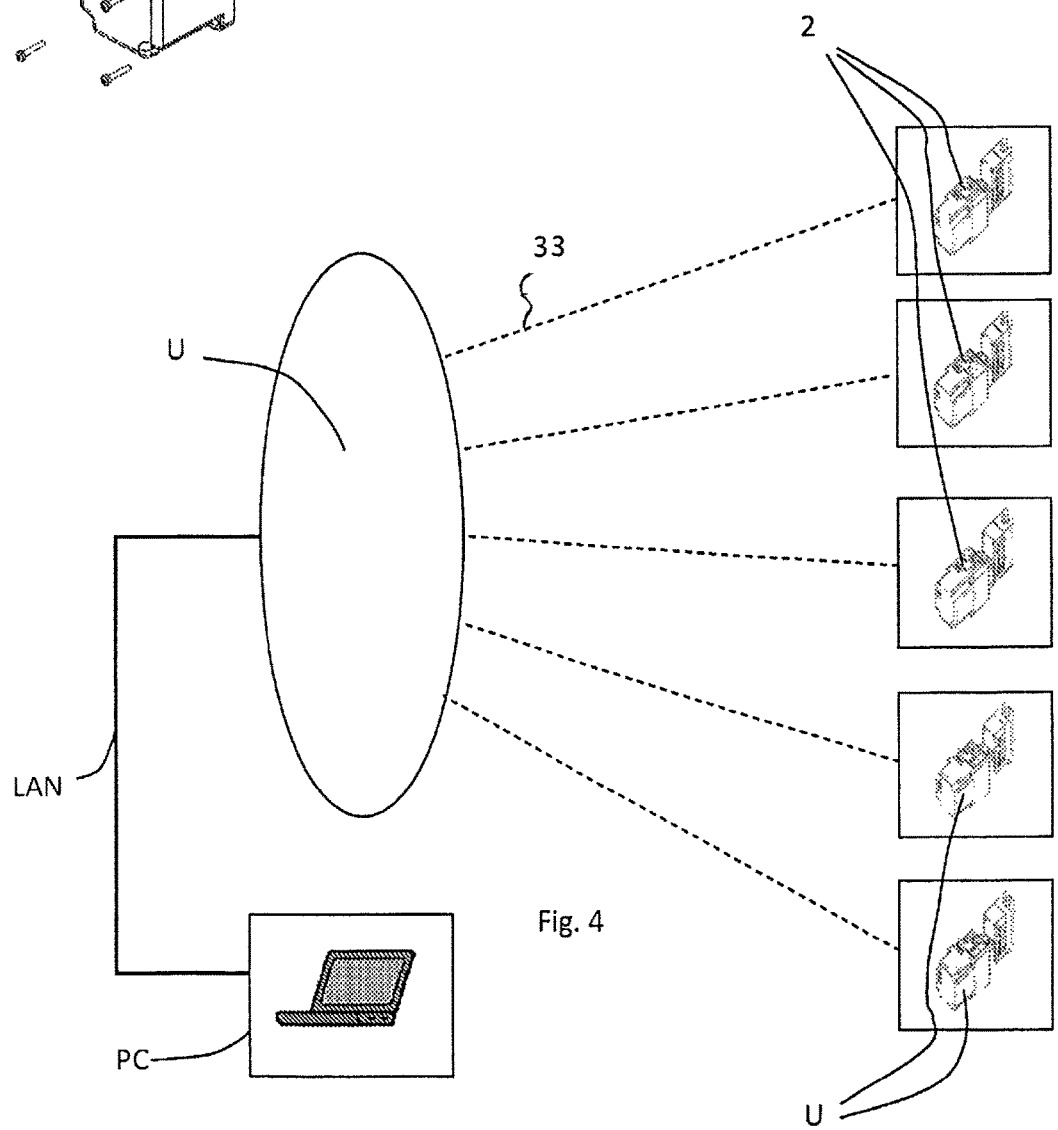

The characteristics and the advantages of the device according to the present invention shall become clearer from the following description, given as an example and not for limiting purposes, of an embodiment made with reference to the attached figures that respectively illustrate:

in FIG. 1 a generic sensor that is coupled with an electronic control device according to the present invention;

in FIG. 2 a generic sensor and an electronic control device according to the present invention, decoupled;

in FIG. 3 an electronic control device in an exploded view, according to the present invention;

in FIG. 4 a connection network via radio between devices according to the present invention to a central equipment.

With reference to the mentioned figure the control device 2 for controlling a sensor 3 according to the present invention comprises a box-shaped body that is provided, on one side, with an electronic connector 21, which is suitable for coupling with an analogous electrical connector 31 associated with such a sensor 3.

Such a connector 21 and 31 in the illustrated embodiment is a circular connector of the military type, which is a widely used standard in both the military field and in the industrial field in general, including the automotive industry.

Bayonet circular military connectors like the one illustrated can follow different size standards concerning, their dimensions, orientation, number of pins and their position, but they are all in general made up of a receptacle 31 and a plug 21 which can be coupled with one another.

A series of grooves on the circular part of the receptacle and the plug ensures that the two halves of the connector are correctly oriented. These connectors are obtained by melted aluminium.

Such a connector ensures the electric connection between the device according to the present invention and the sensor.

The device inside the aforementioned box-shaped body comprises electrical power supply means 22 for said sensor, at least one electronic control board 23 for controlling said sensor with which radio transmission means (for example wi-fi or bluetooth) for transmitting to a central equipment of the data detected by the sensors are associated. FIG. 4 discloses a diagram of a connection network via radio between the devices according to the present invention and a central receiver where the simulated radio waves 33 are depicted.

Moreover, such an electronic board also comprises at least one digital analog converter for the data detected by the sensors and a piloting circuit for providing the sensor with the power supply of the power supply means.

Such power supply means comprise at least one long-life battery like for example a lithium-ion battery. Advantageously, such an electronic board can be a programmable electronic board or it can be provided with a microprocessor, which can thus have its functions reprogrammed by downloading the suitable firmware or software.

The programs can be downloaded and/or updated through a socket 24, for example a USB socket that is arranged on the box-shaped body or via radio if the device is provided with a suitable radio receiver in addition to the transmitter.

Advantageously, the device on the box-shaped body is provided with a plurality of indicators (luminous LEDs, size indicators, battery charge indicators etc. . . . ) of the functioning of the device itself and of the detection carried out by the sensor with which it is associated.

Through the device of the present invention it is possible to implement the connection network illustrated in FIG. 4. In particular, such a network comprises a central equipment (Data-collector) which is connected to the internet by means of a local LAN network. The data detected by the sensors, are pre-processed (filtering, amplification, A/D conversion, etc. . . . ), directly inside the device and is then transmitted via radio to the central equipment U, which in turn through the LAN network (via ethernet) can provide the data to a portal, which can be accessed via internet through a PC, tablet, smartphone etc. . . . Advantageously, with the present invention the algorithms for processing and detecting the correct measurement can be carried out directly on board of the device that transmits the results to a measurement visualisation unit at a later moment. The digital conversion of the analog signals of the sensor carried out by the device makes it possible to transmit the data via radio with any modality and frequency to a unit for collecting data U. In such a way, the device can be coupled on existing sensors and already present on the market, without modifying their primary function thus providing them with the possibility of being autonomous and wireless, but also maintaining the wired operation if necessary, by simply removing the aforementioned device.

The invention claimed is:

1. An electronic control device (2) for verifying a behaviour of an industrial screwer by measuring a rotating and/or braking torque of a rotating shaft of said industrial screwer using data detected by a sensor (3) for measuring said rotating and/or braking torque of said rotating shaft of said industrial screwer, said electronic control device (2) comprising an electronic connector (21), adapted to be coupled to an analogous electrical connector (31) on said sensor (3), said electronic control device (2) comprising a box-shaped body provided on one side of said electronic connector (21), where said box-shaped body is provided with a plurality of indicators of functioning of the electronic control device itself (2) and an indicator of detection of rotating torque or braking torque that is carried out by said sensor (3), said electronic control device (2) also comprising an electrical power supply (22) for supplying electric current to said sensor (3), at least one programmable electronic control board (23) for controlling said sensor (3) and a radio transmission device for transmission of data detected by said sensor (3), said radio transmission device being positioned within said electronic control device (2) for transmitting said data detected by said sensor (3) to a data collector, wherein said electronic control device (2) also comprises an algorithm for processing said data detected by said sensor (3), wherein said electronic control device (2) transmits processed data to a measurement visualisation unit by said radio transmission device, and wherein said electronic connector (21) suitable for coupling with said analogous electrical connector (31) associated with said sensor (3) is a circular connector which is adapted to be coupled with said analogous electrical connector (31) to physically and electrically couple said electronic control device (2) to said sensor (3) and said circular connector is a bayonet circular connector made up of a receptacle and a plug, wherein transmission of said processed data is made by said radio transmission device after said data is detected by said sensor (3) and digitally converted before being transmitted via radio to said measurement visualisation unit.

2. The electronic control device according to claim 1, wherein said at least one programmable electronic control board (23) further comprises at least one digital analogical converter for data detected by the sensor (3).

3. The electronic control device according to claim 1, wherein said at least one programmable electronic control board further comprises at least one circuit for supplying the sensor (3) with an electrical power supply.

4. The electronic control device according to claim 1, wherein said radio transmission for data detected by said sensor (3) uses Wi-Fi technology.

5. The electronic control device according to claim 1, wherein said radio transmission of data detected by said sensor uses Bluetooth technology.

* * * * *